United States Patent [19]

Haas

[11] 3,764,809
[45] Oct. 9, 1973

[54] X-RAY POWDER CAMERA HAVING AN EXTERNAL FILM MAGAZINE ASSEMBLY AND DRIVE MEANS

[75] Inventor: David J. Haas, Stamford, Conn.
[73] Assignee: Pepi, Inc., New York, N.Y.
[22] Filed: Dec. 9, 1971
[21] Appl. No.: 206,287

[52] U.S. Cl. ......................................... 250/469
[51] Int. Cl.. G01n 23/04, G01n 23/20, G03b 41/16
[58] Field of Search .................... 250/51.5, 65 R, 66

[56] References Cited
UNITED STATES PATENTS
| | | | |
|---|---|---|---|
| 3,510,651 | 5/1970 | Chan | 250/66 |
| 2,514,791 | 7/1950 | Parrish et al. | 250/51.5 X |
| 3,005,099 | 10/1961 | Fournier et al. | 250/51.5 |
| 3,070,694 | 12/1962 | Sommers | 250/51.5 |

OTHER PUBLICATIONS
"The Construction And Use Of X-Ray Powder Cameras" by A. J. Bradley et.al. from the Journal of Scientific Instruments, Vol. 18, No. 8, Aug., 1941, pages 216–219.

Primary Examiner—William F. Lindquist
Attorney—Frank R. Trifari

[57] ABSTRACT

A powder camera for x-ray diffraction analysis of powder and crystal specimens, comprises a sealable housing that receives a strip of flim around its inner circumference for exposure by an x-ray beam reflected off a specimen therein. Film is preloaded into a cassette which is inserted into a film magazine holder on the camera, the film strip being advanced from the cassette for exposure, and subsequently rewound onto the cassette which is removed.

10 Claims, 8 Drawing Figures

X-RAY POWDER CAMERA HAVING AN EXTERNAL FILM MAGAZINE ASSEMBLY AND DRIVE MEANS

SUMMARY OF THE PRIOR ART

Known powder cameras utilize an x-ray collimating system which directs a narrowly localized beam of x-radiation at a specimen with a resulting x-ray diffraction pattern of the specimen obtained on film or other x-ray detection means. The general design concepts of x-ray powder cameras of this type are disclosed in U.S. Pat. Nos. 2,514,791 and 2,504,389 and in an article by M. J. Buerger "The Design of X-ray Powder Cameras," Journal of Applied Physics, Vol. 16, 1945, Pages, 501-510. These cameras operate upon the well-known principle that various elements and compounds produce uniform x-ray diffraction patterns, thus revealing the character of the sample as to the compounds present therein.

In actual operation of known cameras, a sequence of steps must be executed for each analysis of a sample with some of these steps involving much time and precise technique and others being wastefully repetitive. Typically, the camera is first mounted via its base onto a camera track associated with an x-ray source apparatus. To align the camera with this x-ray source or generator, a low-power x-ray beam is directed into the camera, through the camera's collimator and exit port assembly, and finally to an aperture covered by an illuminatable fluorescent plate and glass shield. By adjusting the position and orientation of the camera on the track and adjusting the collimator relative to the camera, alignment is achieved. The crystal or powder sample is secured in a holder which is positioned adjacent the outlet end of the collimator, and maintained in alignment even while the holder is rotated.

Next the camera is removed from the camera track and taken to a darkroom for receiving a strip of unexposed film. In these cameras the collimator tube and exit port assembly tube, each have one end fixedly attached to an inside wall of the camera, each tube then extending radially inward toward the center. The film is pre-cut to length, and includes two spaced holes, such that the film can be initially positioned near the center of the camera with the inside, free end of each of these tubes extending through one of the holes; the film is moved radially outward until it is seated via its own resilient stiffness against the inner circumferential wall of the camera. During this placement of the film, great care must be exercised by the operator, to avoid dislodging the sample or otherwise mis-aligning the sample or the collimator. Finally, the operator still within the darkroom, closes and seals the camera.

Now the camera is carried back to the x-ray generator and remounted on the camera track. The film exposure phase will be satisfactory, however, only if alignment of all the relevant components of the system has been accurately maintained. Following film exposure according to the principles of operating powder cameras, the camera is dis-engaged from the track and returned to the dark room where it is opened and the film removed. It is at this time that great care is again required, to remove the film without damaging the emulsion surface, and also to avoid dislodging or otherwise moving the sample or collimator. Also there is need to develop the film rather quickly, because exposed film remaining in the darkroom is subject to accidental overexposure or other damage.

These prior art powder cameras thus have numerous characteristics which pose time consuming problems and inconveniences, and render cameras often inadequate to satisfy the demands placed upon those modern laboratories which engage in x-ray diffraction analysis. Because these prior art powder cameras have a generally standardized structure, the manual techniques described above have also become relatively standardized, which has led to improved skills by the operators, instead of innovations in the cameras. The new invention now disclosed utilizes basic and significant structural changes which result in a new and improved powder camera and method of operating these cameras.

SUMMARY OF THE INVENTION

The invention is a powder camera having a cylindrical housing or casing with front and rear face plates at the two ends of the casing, a base, and means for attachment to an x-ray source. Mounted inside the casing on the rear plate is a collimator tube and a coaxially positioned exit port tube, with a space between the adjacent ends of the tubes, and another space between the remote end of each tube and the adjacent, inside circumferential surface of the casing.

A removable sample holder attachment is provided on one plate, conveniently the rear plate, for receiving and holding the powder or crystal sample. The sample may be positioned for alignment in the holder separate from the camera; also the sample may be positioned and aligned with respect to the collimator after the holder is attached. In overlying relationship to a solt in the casing, a film magazine is attached, this magazine adapted to receive a film cassette, and to advance the film through the slot into the casing to be positioned against the inner circumferential surface of the casing, and later to retract the film into the cassette. A pair of spaced guide tracks around the inside circumference engage and guide the edges of the film strip, and near the slot is a stop element which arrests movement of the lead end of the film strip when it is fully advanced.

This invention has a variety of distinctions and improvements over conventional cameras, despite the fact that the new camera is initially mounted on a camera track and aligned generally as before. Since the camera does not have to be moved again for loading or unloading of either the film or the powder samples, subsequent re-alignment is not required, and consequently the operator is not even required to go into a darkroom until he wishes to develop film from the cassettes after all the exposures are completed. Potential damage to the camera is greatly reduced, because it is no longer carried to and from the darkroom for each film exposure; and certain potential radiation danger to the operators is reduced because the camera may remain attached to the x-ray source and may remain substantially closed even during the temporary removal of a film cassette or powder sample.

In operation, a standard length of film strip is advanced by the magazine winding mechanism, with the film threaded through an aperture in the camera casing and driven into its proper location until the leading edges reaches a stop. Then the film is advanced with more force to put the film in a state of compression, whereby the film is urged radially to be very tight against the circumferential walls; prior cameras have difficulty to achieve this tightness which is important fo proper exposure. Finally a lock mechanism in the new camera holds the winding apparatus in this position with the film loaded tightly against the walls, until released for rewinding.

Further structural innovations of the new camera which make the above film loading technique possible, include attaching the collimator and exit port tubes via mounts to the inside face of the rear plate, instead of to the inner circumferential surface of the casing. Since neither tube touches the circumferential surface, a clear space is provided along which the film strip can be advanced, from the film magazine mounted on the casing. This is totally different from loading and unloading prior cameras, where the film had to be positioned first in the center of the casing and allowed to expand or uncoil radially outward, with two holes in the film strap being penetrated by the collimator and exit tubes, until the film conformed generally to the inner circumferential surface of the casing; subsequent removal of the film required the reverse of these steps. In the new camera removal of the film is accomplished simply by re-winding the film into the film magazine and removing the cassette.

Also in the rear plate of the new camera is a large aperture into which is inserted a removable sample holder. The sample is rotated during film exposure, by a central shaft adapted to be rotated by an external pulley wheel. An alternative type of sample holder than can be inserted in the rear plate aperture is particulate attachment that is similarly driven by a central shaft, but has the sample rotated about a second axis oriented at 45° to the main axis and moved in a circle about the main axis, and simultaneously rotated about its own axis.

It is also feasible with this camera to direct a fluid to the sample via another fixture, to quickly and accurately alter and control the sample's temperature. Thus with this camera there is little risk of misalignment of the inner components, and an operator can make many exposures very quickly, and can do so even with variations of temperatures.

A more detailed disclosure of the invention will follow, with reference to the drawings which illustrate a preferred embodiment of the invention.

DESCRIPTION OF THE PREFERRED EMBODIMENT

The following description of the preferred embodiment of the invention is made with reference to FIGS. 1-8.

Figure 2:
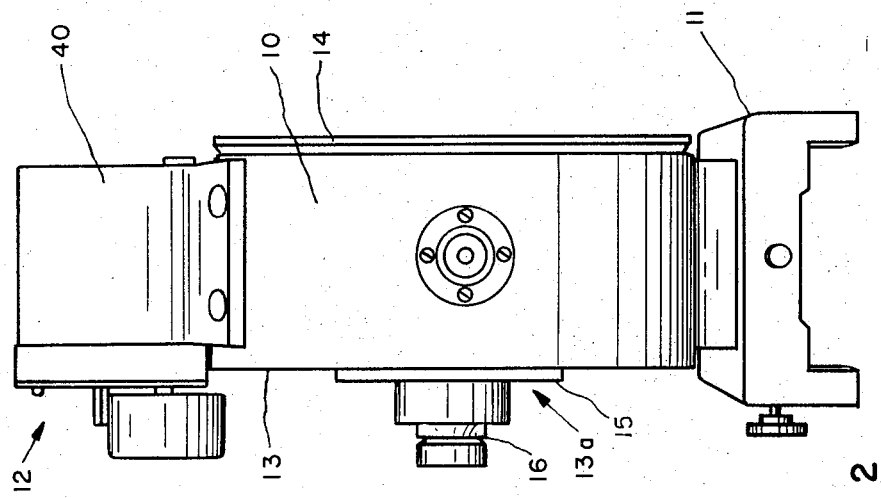
FIG. 2 is a side elevation view thereof with the front plate attached.
Figure 1:
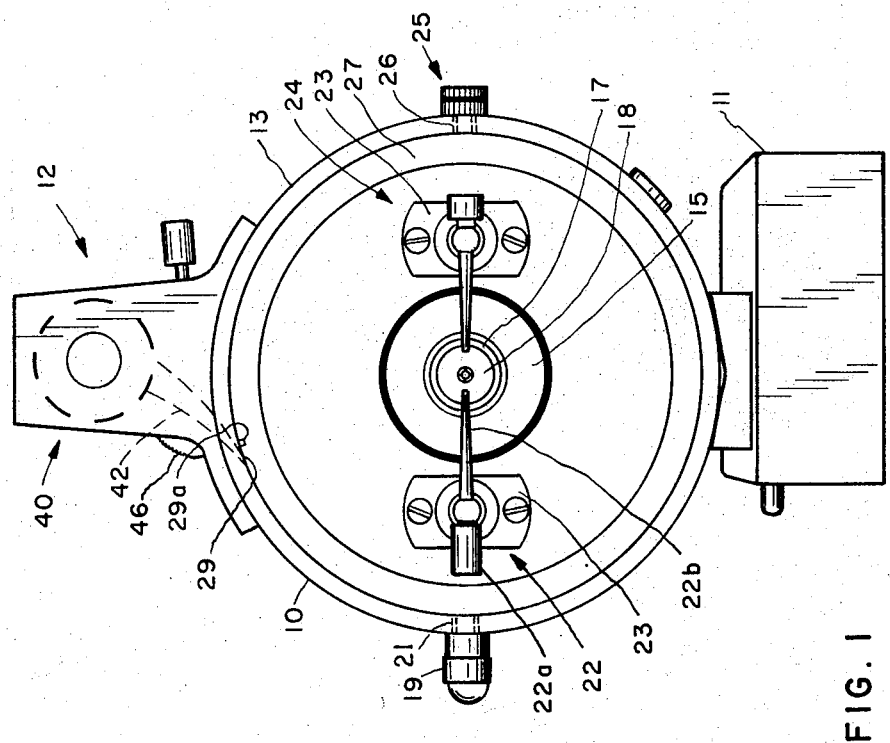
FIG. 1 is a front elevation view of the new powder camera invention with the front plate removed.

FIGS. 1 and 2 show the powder camera of the new invention, wherein the camera housing 10 has a base 11 at the bottom and a film magazine assembly 12 at the top. The housing is essentially a cylindrical body closed at the rear by plate 13, and having a removable front plate 14 shown at FIG. 2. In the center of the rear plate is a sample holder assembly 13a comprising a mounting plate 15 which is secured in the camera housing 13 and a rotatable center portion having a pulley 16 on the outside end, and a magnetic platform 17 on the inside end. The holder element 18 is situated upon the platform 17 and is rotated at whatever speed the pulley 16 is driven. Also the holder 18 may be moved on the surface of platform 17 in directions upward, downward, sideways and angularly to give it the proper position and alignment as will be discussed later.

An x-ray beam is directed into the camera via fitting 19 attached to the casing by mounting plate 20, which leads through an aperture 21 in the side wall of the camera housing 10. Adjacent and coaxial with this aperture 21 is a collimator 22 which is a tubular member tapered from its first end 22a to its exit end 22b and mounted upon a support 23 which is fixedly secured to the rear plate 13 of the camera housing. This collimator is adjustable such that the x-ray beam entering through fixture 19 passes directly through the center of the collimator to be aligned with the sample on holder 18. Also coaxial with the collimator 22 and the fixture 19 is the exit port assembly 24 through which the x-ray beam from the collimator can be received and directed to an alignment assembly 25 situated in the far wall of the camera housing 10, with the alignment unit positioned in aperture 26 of the camera. The alignment assembly will be discussed in further detail with reference to FIG. 3.

It should be noted that the collimator 22 and the exit port assembly 24 both have their large ends spaced apart from the adjacent inside surface of the camera housing 10, thus leaving a clear space 27 completely around the inner circumference of the camera. This space 27 receives the film with the two side edges of a film strip guided by track 28a extending from rear plate 13 and track 28b extending from front plate 14. The film magazine assembly 12 feeds a strip of film down through aperture 29 into the film guide track, first through the space between fixture 19 and end 22a of the collimator; and the film advances downward to the bottom of the camera and then around upward to the space between the alignment assembly 25 and the exit end of the exit port assembly 24, and finally the film continues upward to a stop element 29a located near the entry aperture 29 for the film, shown in FIG. 1.

Figure 3:
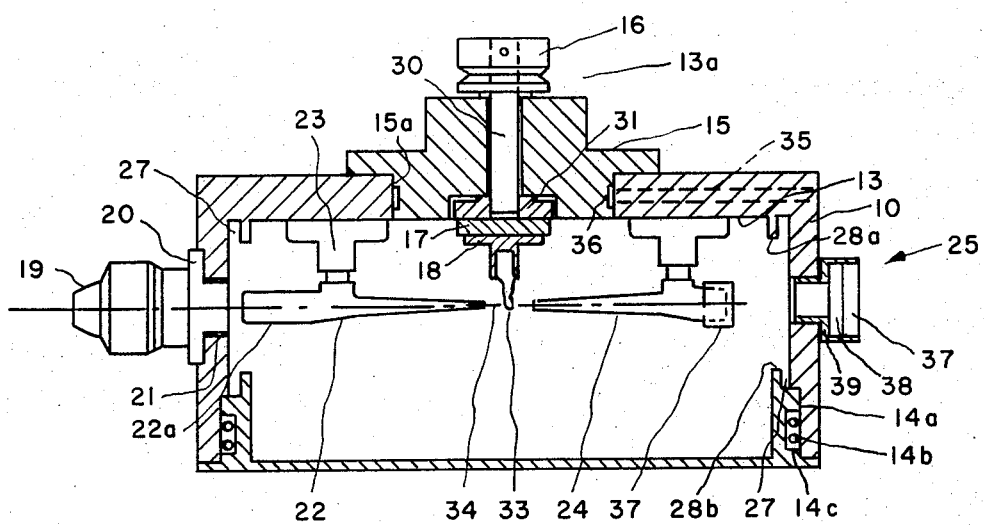
FIG. 3 is a top plain view thereof in sections.

The device of FIGS. 1 and 2 is shown in further detail in FIG. 3 where the circular mounting plate 15 of the sample holding assembly 13is insertable into a corresponding opening 15a in the rear plate 13. Disc 31 rotated by pulley shaft 30, has a magnetic platform or disc 17 secured to its exposed side, with the sample holder 18 removably secured by magnetic attraction to plate 17. Within the center of the holder 18 is a cavity for receiving the sample 33, which is situated to be in direct alignment with the x-ray beam 34 coming through the center of collimator 22. Mounting plate 15 is secured in the aperture 15a of the face plate by a long set screw 35 which engages a groove 36 in the outer periphery of mounting plate 15. A drive means, preferably an electric motor not shown, is engaged via a pulley belt to pulley wheel 16 for rotating the shaft and sample at a predetermined speed.

The exit port assembly 24 is similar in construction to collimator 22 in terms of dimensions and mounting; at the exit of this assembly is a lead cap 37 which is maintained at the exit during the operation of the apparatus and removed prior to operation for alignment of the collimator 2 with the sample and the entrance fixture 19. Front plate 14 is mounted in the front opening of housing 10 and engages the edges thereof by a flange 14a which includes seal elements or O-rings 14b situated in grooves 14c on the flange.

During the preliminary alignment procedure use is made of assembly 25 which consists of the following components. Typically the outer element 37 is leaded glass plate, and the next element 38 is a fluorescent screen, and finally the innermost element 39 is a black opaque element to prevent light from coming into the camera housing. During the aligment procedure the lead cap 37 is removed, the sample 33 is not present, and the x-ray beam is directed through the collimator 22 and through the center aperture of exit port assembly 24, and finally to the alignment assembly 25 where the x-ray beam passes through the opaque disc and activates the fluorescent screen to be illuminated and be visible through the leaded glass plate on the outermost element. At this time the collimator and exit port assembly could be adjusted and the camera housing itself and its base could be positioned relative to the x-ray source, such that the beam would be directed through the central apertures of these components and aligned for contacting the sample when it is also on the axis of the beam.

Figure 6:
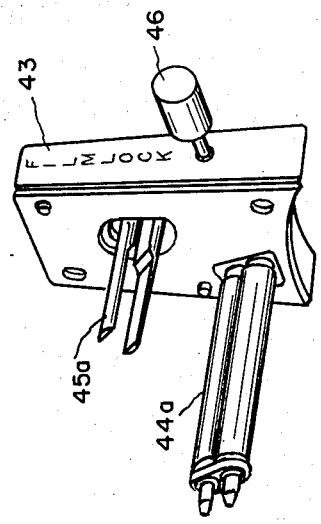
FIG. 6 is a rear perspective view of the film with the cassette removed.
Figure 5:
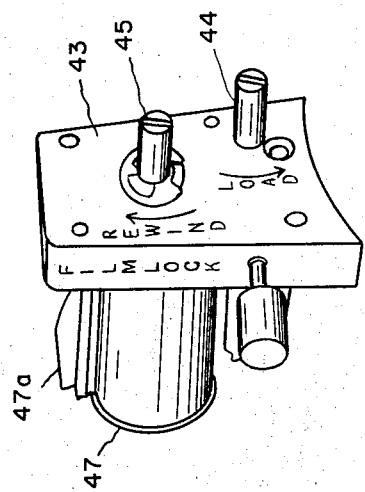
FIG. 5 is a front perspective view of the film with the film cassette mounted. portion
Figure 4:
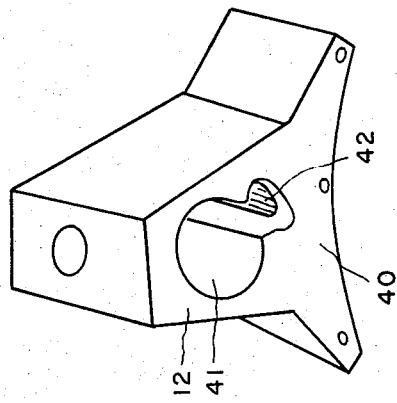
FIG. 4 is a front perspective view of the film magazine, with the film cassette removed.
Figure 8:
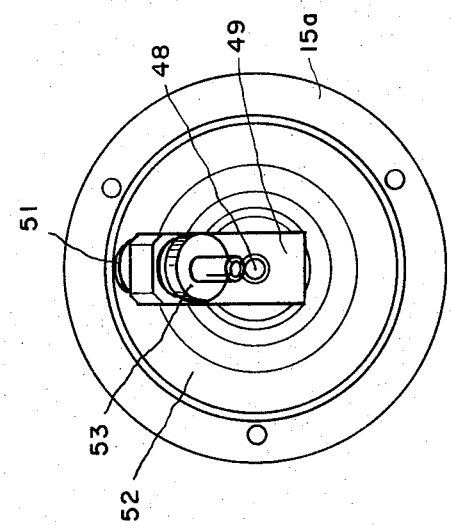
FIG. 8 is a top plan view of FIG. 7.
Figure 7:
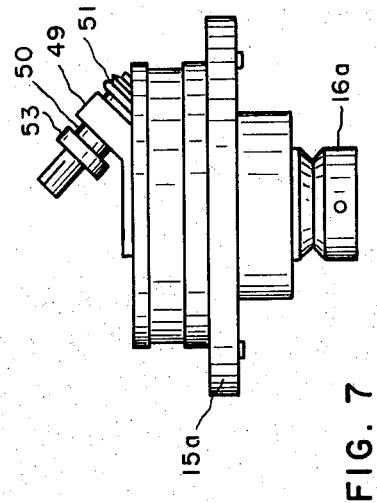
FIG. 7 is a side elevation view of a sample mounting assembly with a particulate attachment.

FIGS. 4, 5, and 6 show details of the film magazine assembly 12. The magazine housing 40 is secured to the top surface of the camera housing 10 as shown in FIGS. 1 and 2. The cavity 41 has dimensions suitable for receiving the film magazine and cassette, and has a further aperture 42 through which the film is advanced from the cassette down into the aperture 29 in the side wall of the camera, and finally to be advanced around the inner periphery of the camera in groove 27 as guided by film guide rails 28a and 28b. FIGS. 5 and 6 show the film magazine mounting plate 43 which has film advanced winding spindle 44 and film re-wind spindle 45 extending forward, with the rear extension 45a of spindle 45 shown on the backside of plate 43 for accommodating a film cassette. The rear of advance spindle 44 comprises a pair of friction rollers 44a through which the film is fed at the time of advancement. Knob 46 can be rotated with its remote end (not shown) engaging the friction rollers to lock them in fixed position after the film is fully advanced and driven into tight engagement within the inner circumferential wall of the housing.

When the film cassette 47 is inserted onto spindle 45 the leader portion of the film 47a is pulled around to friction rollers 45 and threaded between them. Then the film magazine plate with the cassette attached is positioned such that the cassette portin 47 moves into the large portion of the cavity 41, and the friction rollers 45 move into the small portion of the cavity, and the assembly is moved until the film and film advancement rollers are pushed all the way into the cavity, and the magazine plate 43 is flush against the front surface of the film magazine housing 40. Rotation of a knob on spindle 44 drives the film through the cavity or aperture 42 (see FIG. 4), and thence through aperture 29 in the camera housing, and finally completely around the slot 27 as described earlier, until the lead edge of the film is arrested from further motion by stop 29a.

The strip of film would of course be prepared in advance to have one aperture that would overlie the aperture 21 in the camera housing which permits the x-ray beam to traverse the housing and travel through the collimator. After the film is fully threaded into groove 27, it is further advanced so as to put the film in compression and urge it radially outward, tightly against the inside wall surface of the groove 27. Then locking member 46 is rotated so that its end (not hown) is urged against one end of the friction rollers to prevent either from further rotation, with the film thus locked in this state. Removal of the film is accomplished simply by releasing the locking member 46, and then rotating the re-wind spindle 45, until the film is drawn back into the cassette. The magazine plate 43 is pulled away from the magazine holder 40, and the cassette is removed. The film within the cassette is fully protected from light or otherwise undesirable exposure, and can be developed at the operators convenience. Whenever the film cassette is removed another can be replaced on spindle 45 and a new test can be run.

An alternate form of sample holder discussed earlier is that shown in FIGS. 7 and 8, and designated a particulate fixture. This sample holder assembly comprises a mounting plate 15a similar to that of the earlier described sample holder, and a pulley wheel 16a also similar. Attached to the axle 48 of the assembly is a bracket 49 which rotates fixedly with the axle. Through the exposed end of the bracket is another axle 50 having friction rollers 51 at one end which engage a stationary surface 52 of the mounting plate 15a. When the pulley wheel 16a is driven, which drives axle 48 and bracket 49, the axle 50 is also moved in rotation about 48 and the friction rollers 51 are caused to rotate due to their contact with surface 52. This causes axle 50 to rotate while it moves in an independent circular path about axle 48. At the end of axle 50 is a magnetic element, not shown, to which a sample holder 53 is secured and adjustably positioned relative to axle 50 and axle 48.

The above description is that of a whole new Powder Camera which includes features of the new invention; it is contemplated that presently existing prior art cameras with other geometries can be modified to also have these features, especially external loading of the film, and operate according to the principles of this invention.

We claim:

1. In a powder camera for use with an x-radiation source, a powder sample, and an x-ray responsive film, the camera including a casing formed by a wall defining an inner cylindrical circumferential surface and front and rear end walls, x-ray film guiding and support means adjacent said inner surface of said casing, a first aperture through the wall for receiving x-radiation in the form of a beam from said source establishing a path, a second aperture in said wall for receiving film into the casing, means near the center of the rear end wall within the casing for holding the powder sample in the path of the x-ray beam, the improvement in combination therewith comprising a collimator tube secured to said rear end wall, this tube being tapered with a first end adjacent and spaced from said inner circumferential surface and said first aperture, and a second end near the center of the casing, a film magazine assembly external of and mounted on said casing overlying said second aperture and comprising a magazine housing including a film cavity for receiving a film cassette therein, and a drive means carried by said housing and consisting of a first part for engaging the film of a cassette in said cavity, this first part being operable forward for advancing the film through said second aperture into said film guiding and support means of the casing to be in contact with said inner surface, and for subsequently being operable backward for withdrawing the film back into said cassette in the housing, and a second part engaging the first part for driving the first part forward to advance the film and backward to withdraw the film.

2. An apparatus according to claim 1, wherein the casing wall includes a third aperture aligned with the first aperture and the collimator, further comprising an x-ray exit port tube mounted on said rear end wall coaxially with the collimator and third aperture, the exit port tube having an entrance end adjacent the center of the casing and a remote end spaced from said inner circumferential surface of the casing and said third aperture, and means for barring the transmission of x-radiation through said third aperture.

3. Apparatus according to claim 2 further comprising in sequential order, the first being closest to the x-ray source a light opaque element, a fluorescent element, and a leaded-glass element axially spaced in said third aperture for alignment of the collimator with the x-ray source.

4. Apparatus according to claim 1 wherein said film magazine housing comprises a mounting plate, a spindle extending from the mounting plate for receiving the film cassette thereon, and said first part of said drive means being adjacent said spindle for engaging and advancing film from said cassette, and said second part of said drive means being carried on said plate for selectively activating said spindle and said first part of said drive means.

5. Apparatus according to claim 4 wherein said first part of said drive means comprises a pair of adjacent rollers, and said second part of said drive means for activation of said spindle and of said first part of said drive means, comprises a rotatable knob.

6. Apparatus according to claim 4 further comprising means for locking said drive means.

7. Apparatus according to claim 1 wherein said film guiding and support means comprises a pair of circumferential guides spaced apart and each radially inward spaced from the inner surface of the casing to define a narrow slot in which the edge of the film is guided when it is advanced around the periphery of this surface inside the casing.

8. In a powder camera operable with a strip of x-ray responsive film and having a casing including an inner cylindrical circumferential wall, means for guiding and supporting said film in contact with said inner wall, and an aperture in the casing for admitting said film, the improvement in combination therewith operable with a film cassette containing said strip of film, comprising a film magazine assembly external of and mounted on the casing overlying said aperture, the assembly including a housing secured to the camera casing, the housing having a cavity for receiving a film cassette, means for providing a light seal about said film from said assembly into the casing, the magazine assembly further comprising a drive means carried by said housing and consisting of a first part for engaging the film of a cassette in said cavity, this first part being operable forward for advancing the film through said aperture into said film guiding and supporting means of the casing to be in contact with said inner surface, and for subsequently being operable backward for withdrawing the film back into said cassette in the housing, and a second part engaging the first part for driving the first part forward to advance the film and backward to withdraw the film.

9. Apparatus according to claim 8 wherein said film cassette is a cylindrical container with 35 mm. film therein wound on a rotatable spool.

10. Apparatus according to claim 8 wherein said first part of said drive means comprises a pair of closely adjacent rollers between which the film is driven.

* * * * *

PO-1050
(5/69)

UNITED STATES PATENT OFFICE
CERTIFICATE OF CORRECTION

Patent No. 3764809  Dated October 9, 1973

Inventor(s) David J. Haas

It is certified that error appears in the above-identified patent and that said Letters Patent are hereby corrected as shown below:

Column 2, line 33, "solt" should be --slot--

Column 3, line 1, "fo" should be --for--

Column 3, line 56, delete "portion"

Column 4, line 56, "13is" should be --13a is--

Column 4, line 62, "receivIng" should be --receiving--

Column 5, line 8, "2" should be --22--

Column 6, line 13, "(not hown)" should be --(not shown)--

Signed and sealed this 12th day of March 1974.

(SEAL)
Attest:

EDWARD M. FLETCHER, JR.
Attesting Officer

C. MARSHALL DANN
Commissioner of Patent